UNITED STATES PATENT OFFICE.

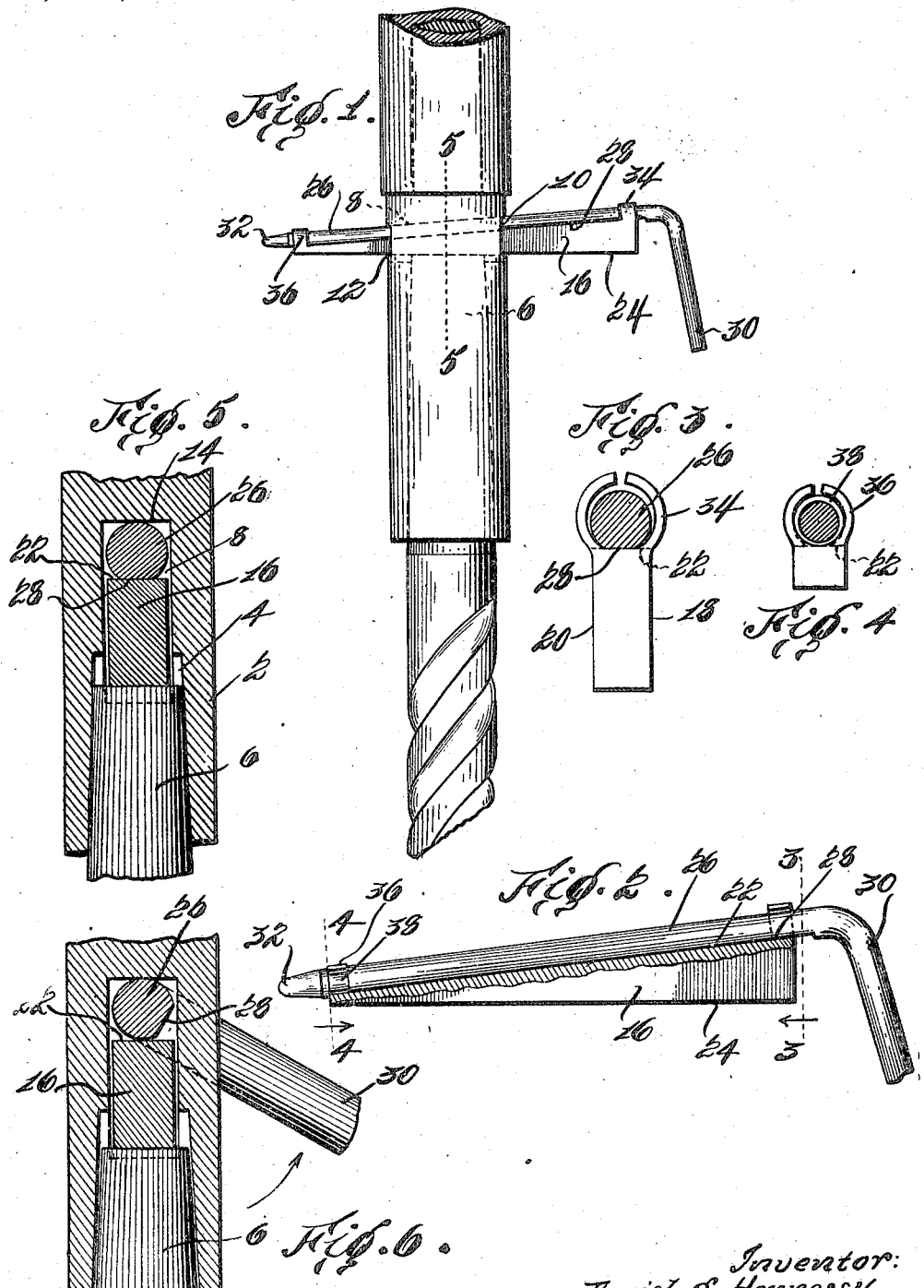

DANIEL E. HENNESSY, OF HOLYOKE, MASSACHUSETTS.

AUTOMATIC DRIFT.

1,161,310.  Specification of Letters Patent.  Patented Nov. 23, 1915.

Application filed June 21, 1915. Serial No. 35,345.

*To all whom it may concern:*

Be it known that I, DANIEL E. HENNESSY, a citizen of the United States, residing at Holyoke, county of Hampden, and State of Massachusetts, have invented certain new and useful Improvements in Automatic Drifts, of which the following is a clear, full, and exact description.

This invention relates to tools which are particularly adapted for effecting a relative separation of the objects or parts operated upon, and is herein shown as embodied in a tool of the type known as "drifts."

An object of the invention is to provide a drift which will be much more convenient to use than known drift constructions and which moreover will operate with greater certainty and with less shock to the parts operated upon.

More particularly the invention aims to provide a self-contained drift, that is, one which will not require the coöperation of another tool for its successful operation.

Other objects and important features of the invention will appear from the following description and claims when considered in connection with the accompanying drawings, in which—

Figure 1 shows a preferred form of the invention and its manner of use in an ordinary drill press, only so much of the press being shown as is necessary for illustrating the mode of operation of the invention; Fig. 2 is a side elevation partly in section, showing the improved drift on a somewhat larger scale; Fig. 3 is a section on the line 3—3 of Fig. 2; Fig. 4 is a section on the line 4—4 of Fig. 2; Fig. 5 is a section on the line 5—5 of Fig. 1, with the parts in the position shown in Fig. 1; and Fig. 6 is a section similar to Fig. 5 with the parts in the position which they assume when the handle of the drift is turned to move the drill out of its chuck.

In power-operated drill presses, the spindle-shaft or drill-chuck 2 is commonly provided with a tapered socket 4 in which the tapered upper end of the shank 6 of the drill is received, the socket 4 being usually deep enough so that the drill when forced into the socket does not strike the bottom of the socket. Intersecting this socket in the spindle shaft is a slot 8 which tapers from one side of the shaft to the other, the slot having a large opening 10 upon one side of the shaft and a small opening 12 upon the other side of the shaft.

The purpose of the tapered slot 8 in the spindle shaft is to facilitate the removal of the drill from the socket 4 when it is desired to replace it with a drill of another size or for any other purpose, and in practice this removal of the drill is usually effected by means of a drift, which is simply a wedge-shaped bar adapted to enter the slot 8 and to be forced into the slot until one of its edges strikes the upper end 14 of the slot and its other edge strikes the upper end of the shank 6 of the drill. The operator strikes the end of the drift with a hammer or other tool, thus forcing the drift farther into the slot, whereby the drill shank is forced down in the socket 4 and loosened so that it can easily be removed. It will be observed that this mode of loosening the drill requires the use of two tools and thus takes considerable of the operator's time. An important object of the invention, therefore, is to provide an improved drift which can be easily and quickly manipulated to remove the drill or other tool from its holder and which will not require the coöperation of any other tool for this purpose.

Although the invention is herein described in connection with its use in drill presses, it will be understood that the invention is not restricted to the illustrated use and that it is of general applicability in the art to which it relates.

The illustrated drift comprises a wedge-shaped body 16 having parallel sides 18 and 20, and upper and lower converging sides 22 and 24 and a cam 26 which is preferably made in the form of a cylindrical rod 28 slabbed off upon one side, the slabbed portion extending preferably along the whole length of the side 22 of the wedge 16. Beyond the larger end of the wedge 16 the rod is preferably extended and bent at an angle to the cam 26 to form a handle 30 by which the cam may be turned. Beyond the smaller end of the wedge 16, the rod or cam is preferably also extended and tapered as at 32 to form a lead to facilitate the introduction of the drift into the slot in the spindle-shaft or between any two objects which it is desired to operate upon.

In order to confine the cam 26 upon the wedge 16, the wedge 16 may conveniently be provided with integral ears 34 and 36 at its respective ends, the ears 36 being adapted to be received within an annular groove 38 extending about the cam 26, whereby the cam is held against endwise movement upon the wedge, the ears 34 loosely embracing the cam at the other end of the wedge.

In curving the ears 34 over the cam 26 to confine the cam upon the wedge, space is provided for turning the cam about its longitudinal axis until its greater transverse dimension is normal to the side 22 of the wedge, whereby the drift is expanded across its taper, as shown in Fig. 6 of the drawings. It will be noted that the means for confining the cam 26 upon the wedge 16 is so constructed that the cam may remain constantly in contact with the face 22 of the wedge as it is being turned from the position shown in Fig. 5 to the position shown in Fig. 6.

The mode of operation of the invention will be readily understood from the foregoing description and from a study of Figs. 1, 5 and 6 of the drawings. The drift being inserted in the slot 8 as shown in these figures, the operator grasps the handle 30 and turns the cam from the position shown in Fig. 5 to the position shown in Fig. 6. It will be noted that the wedge 16 is freely suspended from the cam 26 so that when the operator picks up the drift by grasping the handle 30, the wedge 16 will gravitate to a position beneath the cam 26, whereby the parts will be in position to be inserted readily into the vertical slot 8 in the spindle-shaft.

What I claim as new is:—

1. A drift shaped to enter a tapered slot and comprising two connected members having their remote sides converging, and means carried by one of said members to effect a movement thereof to expand said drift across the taper of said slot.

2. A tapered drift comprising two connected members relatively movable to expand said drift across its taper, and means carried by said drift to effect said relative movement.

3. A tapered drift comprising two connected relatively movable members constructed and arranged to expand said drift uniformly across its taper, and means carried by said drift to effect the relative movement of said members.

4. A tapered drift comprising two members connected relatively movable to expand said drift across its taper, said members being so shaped and so connected as to effect said expansion without changing the other dimensions of said drift, and means carried by said drift for effecting the relative movement of said members.

5. A tool of the class described comprising a tapered member, a second member having substantially parallel sides and arranged to extend along one of the tapered sides of said first member and normally in engagement therewith, said second member having different transverse dimensions and being connected to said first member and arranged to be turned about its longitudinal axis whereby said tool may be expanded laterally without changing its taper.

6. A drift comprising a cam, and a wedge carried by said cam.

7. A drift comprising a cam, and a wedge carried by said cam, said cam being arranged to turn about an axis substantially parallel to one of the converging sides of said wedge.

8. A longitudinally tapered drift comprising two members extending side by side lengthwise of said drift, one of said members having substantially parallel sides but different transverse dimensions and being arranged to be turned upon the other member to expand or contract said drift without varying its taper.

9. A tapered drift comprising a wedge, and means comprising a cam connected to said wedge for expanding said drift across its taper.

10. A tapered drift comprising a wedge, and means comprising a cam for expanding said drift across its taper, said means being connected to said wedge and being constructed and arranged to effect said expansion uniformly along one side of said drift.

11. A tapered drift comprising a wedge-shaped member, and a member of substantially uniform cross-section but of different transverse dimensions extending along one side of and connected to said wedge, said last mentioned member being arranged to be turned in its connections to interpose different dimensions between said wedge and an object when a relative movement thereof is desired.

12. A tapered drift comprising a wedge having two parallel sides and two converging sides, a cam extending along one of the converging sides of and connected to said wedge and arranged to turn in its connections about an axis substantially parallel to said side to expand and contract said drift, said cam being constructed and arranged to lie between the planes of the parallel sides of said wedge in all positions into which it may be turned.

13. A drift comprising a cam and a wedge freely suspended from said cam whereby it tends to gravitate into a position beneath said cam.

14. A drift comprising a wedge, and a cam extending along one of the converging sides of said wedge, said wedge being provided with integral tongues adapted to embrace and confine said cam thereon.

15. A tapered drift comprising a wedge-shaped member and a member of substantially uniform cross-section but of different transverse dimensions extending along one of the converging sides of said wedge and normally in contact therewith throughout substantially the whole length of said side, and connections between said wedge and said member constructed to permit said member to be turned upon said wedge about an axis substantially parallel to the said side of said wedge without disturbing the contiguity of said wedge and said member.

Signed at Holyoke, Mass., this 1st day of May, 1915.

DANIEL E. HENNESSY.

Witnesses:
ABRAM BERNSTEIN,
CHAS. CLARK.